United States Patent [19]

Strader, Jr.

[11] 4,054,312
[45] Oct. 18, 1977

[54] TELESCOPING ENERGY ABSORBER WITH ELASTOMERIC PRESSURE RELIEF VALVE

[75] Inventor: James O. Strader, Jr., Dayton, Ohio
[73] Assignee: General Motors Corporation, Detroit, Mich.
[21] Appl. No.: 714,096
[22] Filed: Aug. 13, 1976
[51] Int. Cl.² .......................................... B60R 19/02
[52] U.S. Cl. ................................. 293/70; 213/223; 267/64 R; 267/116; 293/DIG. 2; 293/89
[58] Field of Search .................. 293/60, 70, 73, 84, 293/85, 86, 89, DIG. 2; 188/282; 267/64 R, 116, 139; 137/843; 213/223

[56] References Cited

U.S. PATENT DOCUMENTS

| 3,343,566 | 9/1967 | Luckenbill | 137/843 X |
|---|---|---|---|
| 3,498,321 | 3/1970 | Barrett et al. | 137/843 |
| 3,547,355 | 12/1970 | Salazar | 137/843 X |
| 3,722,874 | 3/1973 | Kress | 267/64 R |
| 3,814,219 | 6/1974 | Fannin et al. | 293/70 X |
| 3,820,771 | 6/1974 | Kerr et al. | 293/60 X |
| 3,920,274 | 11/1975 | Fannin | 293/70 |

Primary Examiner—Trygve M. Blix
Assistant Examiner—Sherman D. Basinger
Attorney, Agent, or Firm—Charles R. White

[57] ABSTRACT

This energy absorber has an inner cylinder telescopically mounted in an outer cylinder and carries a cylinder cap separating cylinder interspace into a pair of contractible and expandable pressure chambers filled with a hydraulic fluid. On impact, the cylinders telescope and a one-piece elastomeric valve controls the flow of fluid between chambers through an orifice in the cylinder cap. The valve is a variable rate spring having a relatively constant force/deflection characteristic to control oil flow while providing high efficiency pressure relief action. Gas spring means provides the motive force to return the unit to an extended position after removal of the impact load.

3 Claims, 4 Drawing Figures

TELESCOPING ENERGY ABSORBER WITH ELASTOMERIC PRESSURE RELIEF VALVE

This invention relates to a telescopic energy absorber unit mounting a bumper to a vehicle and more particularly to a new and improved elastomeric pressure relief valve which hydraulically connects expandable and contractible fluid chambers in the unit to provide a substantially constant pressure in the unit so that unit stroke is proportional to impact velocity.

While various valving arrangements have been utilized or proposed to effectively control the fluid flow and pressure within telescopic energy absorber units mounting bumpers to vehicles, they are generally of complex constructions and are relatively expensive. Many of the prior art devices are velocity sensitive and stroke through a fixed distance for varying impact loads. Such units generally demand considerable clearance between the bumper corners and vehicle body work in order to avoid damage when the bumper is subjected to a corner impact. While other devices are load-sensitive and stroke through variable distances proportional to impact velocity, their valve constructions are multi-part and complex as compared to that of the present invention.

With this invention a new and improved energy absorber unit having telescoping inner and outer cylinders is provided with an advanced one-piece elastomeric valve that enhances assembly of the unit while providing important reduction in weight and costs over many of the prior art devices. More specifically, the energy absorber unit of this invention incorporates a new and improved one-piece valve device which is used with telescoping energy absorber units having expandable and contractible fluid chambers. The valve is an elastomeric pressure relief element, mounted on the cylinder cap by a retainer, that controls the flow of fluid between the chambers to maintain a constant pressure in the unit so that the unit stroke varies over a wide range of impact speeds and loads. With this invention the elastomeric valve provides a variable rate spring that has a relatively constant force-deflection characteristic. Using this valve to control fluid flow in the energy absorber, a very flat and highly efficient pressure relief action is provided to effectively control the absorption of a relatively large amount of energy such as ordinarily encountered in a low speed vehicle impact. This invention is a simplified design in that only two parts are employed as opposed to the multi-part construction of the valves of prior art energy abosrber units. In the preferred construction, a retainer and an elastomeric valve element are employed to eliminate valving and special springs of the prior art. The one-piece valve may be readily assembled into the unit, preferably trapped in a cage secured to the cap member of the unit. On impact of the bumper, the valve element being load-sensitive moves away from the opening in the valve cap in accordance with a load applied thereto so that fluid flows between the chambers and there is constant pressure maintained in the unit as the cylinders move toward a collapsed position. With constant pressure maintained in the unit, energy absorption is substantially uniform throughout the entire stroke of the unit. This valving provides for reduced stroke on lower speed impacts and particularly reduced bumper travel on corner impacts in which the movement of the bumper is magnified by the lever action as it turns on a pivot remote from the impact load.

These and other features, objects and advantages of this invention will become more apparent from the following detailed description and drawing in which.

Figure 1:
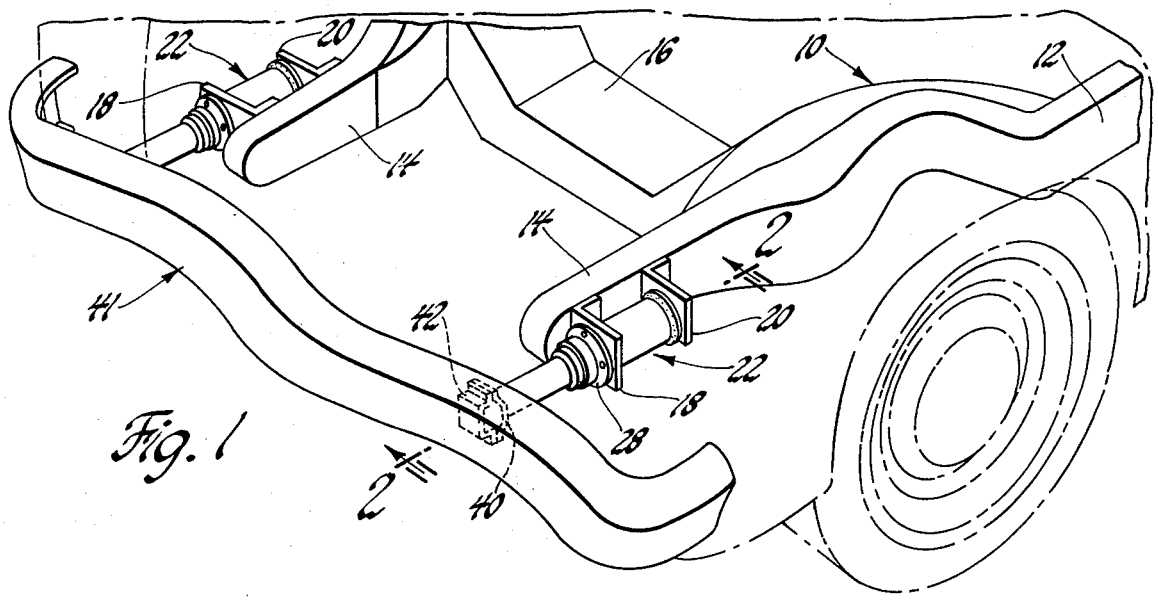
FIG. 1 is a perspective view of a vehicle chassis frame and telescoping energy absorber units mounting a bumper assembly to the frame.

Referring now in particular to FIG. 1 of the drawing, there is a vehicle chassis frame 10 comprising a pair of laterally spaced side rails 12 having forwardly extending horn portions 14 interconnected by a front cross beam 16. Bolted to each horn portion 14 are front and rear L-shaped brackets 18 and 20 which are longitudinally spaced from each other that connect identical left and right energy absorber units 22 to the chassis frame 10. Each energy absorber unit 22 extends through a circular opening in its associated front or outermost bracket 18 and has an outer cylinder 24 welded at 26 to an annular collar 28. The collar 28 is in turn bolted or otherwise rigidly secured to the front bracket 18. The outer cylinder 24 is closed by a circular end cap 30 which is secured thereto by annular weld 31. Annular flash shield 32 secured in the end of cylinder 24 makes peripheral contact with the inner wall of this cylinder to bar the entry of weld flash into the energy absorber unit. The end cap 30 has an axially extending threaded stud 33 rigidly fixed thereto which projects outwardly through an opening 34 in bracket 20. Nut 36 threaded onto stud 33 rigidly secures the end cap and thus the outer cylinder to bracket 20.

In addition to the outer cylinder 24, each energy absorber unit 22 comprises an inner cylinder 38 that is mounted for limited telescoping movement within cylinder 24 and that projects forwardly therefrom. The forward end of the inner cylinder 38 is closed by a base plate 40 welded thereto which is adapted to be secured to a bumper assembly 41 by suitable connector or pivot means 42. An annular flash shield 43 seated on a central internal shoulder of the base plate 40 contacts the inner wall of cylinder 38 to keep weld flash from entering the unit 22. Secured to the inner or rearward end of the inner cylinder 38 is a metallic cap 44 that separates the interior of the cylinders into intermediate and rear fluid chambers 46 and 48, each of which is filled with a suitable hydraulic fluid such as oil. A cylindrical cap sleeve 50 of suitable material such as glass-filled Nylon is mounted over the cylinder cap 44 to slidably fit the inner diameter of the outer cylinder 24. There is, however, sufficient clearance between the cap sleeve 50 and the inner wall of the cylinder 24 so that chamber 48 is in direct hydraulic communication with the inner annular space 51 formed between the outer and inner cylinders. The forward end of this inner space is sealed by O-ring 52 disposed between cylinders 24 and 38.

Mounted within the inner cylinder 38 is a floating sheet metal piston 54 fitted with an O-ring 56 that separates chamber 46 from a front chamber 58 formed between floating piston 54 and base plate 40. A quantity of gas is compressed in chamber 58 being injected through an orifice 60 formed in the base plate which is subsequently sealed by a ball 62 welded therein. The force of gas compresed within chamber 58 acts on the oil in chambers 46 and 48 and urges the cylinders 38 and 24 to the normally extended position shown in FIGS. 1 and 2. Stop sleeve 63 rigidly secured to cylinder 38 contacts the inwardly crimped end 65 of cylinder 24 to limit the outward movement of cylinder 38 relative to cylinder 24. An elastomer sleeve 67 is mounted on cylinder 38 between stop sleeve 63 and O-ring 32. This sleeve is a resilient member that frictionally contacts and drags along the inner wall of the outer cylinder on return stroke of the unit from a collapsed position to add a drag load to reduce the recovery rate.

The cap sleeve 50 is generally cylindrical in shape and has an outer peripheral portion hooked around the circumferential outer edge of cap 44 and has an inner peripheral portion extending radially inwardly to partially cover the front face of the cap 44.

Figure 2:
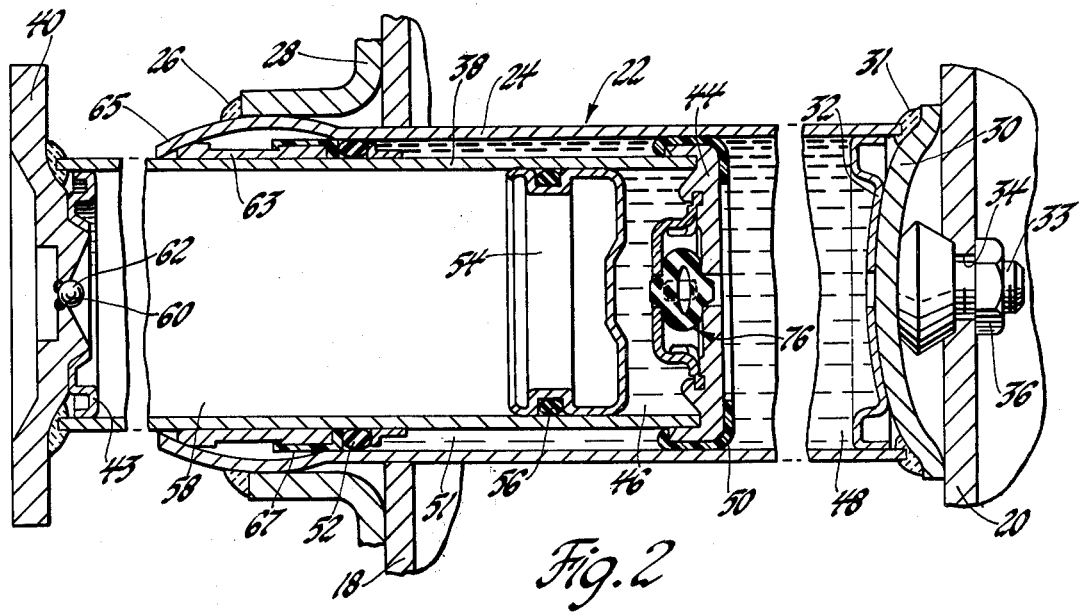
FIG. 2 is an enlarged cross-sectional view of one of the energy absorber units of FIG. 1 taken along the plane indicated by line 2—2 of FIG. 1 showing the energy absorber unit in its normally extending position.
Figure 3:
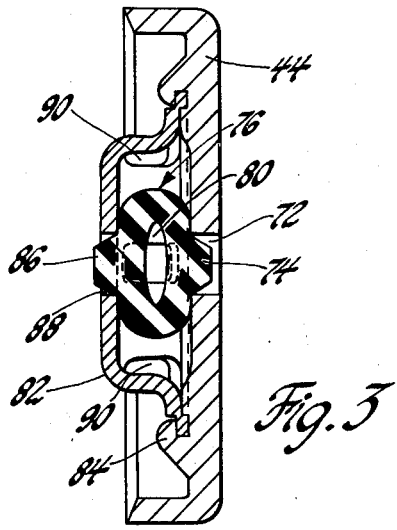
FIG. 3 is an enlarged view of the cylinder cap and pressure relief valve incorporated in FIG. 2.
Figure 4:
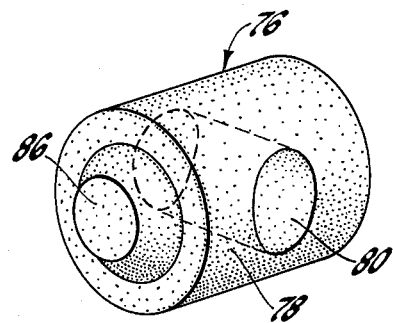
FIG. 4 is a perspective view of the pressure relief valve element of FIGS. 2 and 3 in a relaxed state.

As shown in FIGS. 2 and 3 the end cap 44 is formed with an annular centralized flow orifice 72 into which is seated the truncated conical inner tip 74 of an elastomer pressure relief valve 76. As shown in FIG. 4 the valve is formed with a cylindrical body 78 having a transverse opening 80 extending therethrough permitting valve deflection and entrapment within a hat-like cage 82 which is subsequently fastened at its periphery to the inside wall of cylinder cap 44. This fastening may readily be accomplished by coining material 84 of the cap over the peripheral annular edge of the cage 82. The valve also has a truncated conical outer tip 86 opposite to inner tip 74 which seats in a central opening 88 in the cage aligned with orifice 72. Side openings 90 in the cage provide for fluid passages under operating conditions described below.

Assuming an impact load of at least a minimum magnitude is imparted to the bumper assembly 41, the inner cylinder 38 will be telescoped from the extended position of FIGS. 1 and 2 toward a collapsed position in proportion to the magnitude of impact. As the inner cylinder 38 moves rearwardly into the outer cylinder, the elastomeric valve element 76 will deflect in accordance with the magnitude of impact velocity to provide passage of oil from contracting chamber 48 via the side openings in the cage 82 to the chamber 46. In response to this action, chamber 46 expands by displacing the piston 54 to compress the gas in chamber 58. The buckling action of the valve element 76 on bumper impact produces the same results as a variable rate spring that has a relatively constant force/deflection characteristic. The fluid flow between the chambers as controlled by the action of the valve provides a flat and highly efficient pressure relief action. With a pressure responsive valve, stroke varies with impact loads so that lower impact speeds result in reduced stroke. When the impact force has been dissipated, the gas spring acting on the oil in chamber 46 forces the oil through the interface of the valve element 76 and the valve seat provided by sleeve 70. The flow path restriction thus provided by these two elements reduces the rate of recovery so that the cylinders gradually return to their original positions to extend the bumper assembly for subsequent impacts.

It will be appreciated that this invention provides for quick and easy assembly in that the tips of the valve element can be readily positioned in the openings 72 and 88 in the sleeve 70 and cage 82 respectively. The valve element is deflected and trapped as shown in FIGS. 2 and 3 by pressing the cage into the cap and coining the material of the cap over on the peripheral annular edge of the cage. This invention readily replaces prior multipart valve constructions with the unitary one-piece elastomer element shown in FIG. 4 with important savings in cost and weight.

While a preferred embodiment of this invention has been shown and described to illustrate operating principles thereof, other embodiments will become apparent to those skilled in the art. Accordingly, this invention is set forth in the following claims.

I claim:

1. An impact energy absorbing unit mounting a bumper assembly to a support on an automotive vehicle comprising: first and second cylinders, support means mounting said first cylinder for telescopic movement with respect to said second cylinder between an extended position and a retracted position, motor means for moving said cylinders to said extended position, said first and second cylinders having cooperating stop means to establish the extended position of said cylinders, said first cylinder having cap means fixed at one end thereof and slidably disposed in said second cylinder to provide variable volume first and second fluid chambers in said unit, a hydraulic fluid in said first and second chambers, two-way flow control means for hydraulically interconnecting said chambers, said flow control means comprising an opening in said cap means and valve means normally closing said opening to prevent fluid flow in either direction through said opening, said valve means comprising a one-piece valve element of elastomeric material, said valve element having a resilient main body and having a flow control portion normally biased by said main body into seated engagement with said opening to normally block the passage of fluid therethrough, entrapping means disposed over said valve element and fastened to said cap means for securing said valve element thereto to thereby yieldably hold said flow control portion in seated engagement with said opening, said flow control portion of said valve element being deflected from said opening in response to an increase in pressure in said first chamber from an impact load applied to the bumper assembly moving said cylinders to a retracted position to thereby open a restricted passage through said opening and to allow the flow of fluid from said first to said second chamber, said motor means being subsequently operative to move said clyinders to said extended position and force fluid from said second to said first chamber between said opening and said flow control portion of said valve element when seated therein.

2. An impact energy absorbing unit mounting a bumper assembly to a support on an automotive vehicle comprising: first and second cylinders, support means mounting said first cylinder for telescopic movement with respect to said second cylinder between an extended position and a retracted position, said first and second cylinders having cooperating stop means to establish the extended position of said cylinders, said first cylinder having cap means fixed at one end thereof and slidably disposed in said second cylinder to provide variable volume first and second fluid chambers in said unit, a hydraulic fluid in said first and second chambers, two-way flow control means for hydraulically interconnecting said chambers, said flow control means comprising an opening in said cap means and a one-piece yieldable valve element of elastomeric material having a variable deflection rate and having a projection extending into said opening, cage means secured to said cap means and trapping said projection of said valve element in a blocking position with respect to said opening, said valve element being deflectable so that said projection moves from said opening to control the flow of fluid from said first to said second chambers for absorption of energy from an impact load applied to said bumper assembly causing said cylinders to telescope toward said retracted position, and motor means being operative to return said cylinders to said extended position by forcing fluid from said second to said first chambers around the restriction between said projection and said opening so that the rate of return of said cylinders to said extended position is controlled.

3. An impact energy absorbing unit mounting a bumper assembly to a support on an automotive vehicle comprising: first and second cylinders, support means mounting said first cylinder for telescopic movement with respect to said second cylinder between an extended position and a retracted position, said first and second cylinders having cooperating stop means to establish the extended position of said cylinders, said first cylinder having cap means fixed at one end thereof and slidably disposed in said second cylinder to provide variable volume first and second fluid chambers in said unit, a hydraulic fluid in said first and second chambers, an annular orifice in said cap means hydraulically interconnecting said chambers, valve means spanning said orifice to control and normally block the flow of fluid in either direction therethrough, said valve means comprising a resilient one-piece elastomeric body having a projection normally seated in said annular orifice, a cage secured to said cap for trapping said body of said valve element and holding said projection in an operative position in said orifice, said body of said valve element being yieldable in response to an impact load applied to said bumper assembly causing said cylinders to telescope and said projection to move from blocking engagement with said orifice and permit the fluid to flow between said chambers through said orifice, and motor means in said unit providing a force on the fluid in said chambers to force fluid around said projection and through the restriction between said orifice and said projection to gradually restore said first and second cylinders to the extended position after removal of said impact load.

* * * * *